J. PANZNER & J. PEKAR.
ATTACHMENT FOR BABY CARRIAGES.
APPLICATION FILED OCT. 24, 1918.
1,301,593. Patented Apr. 22, 1919.
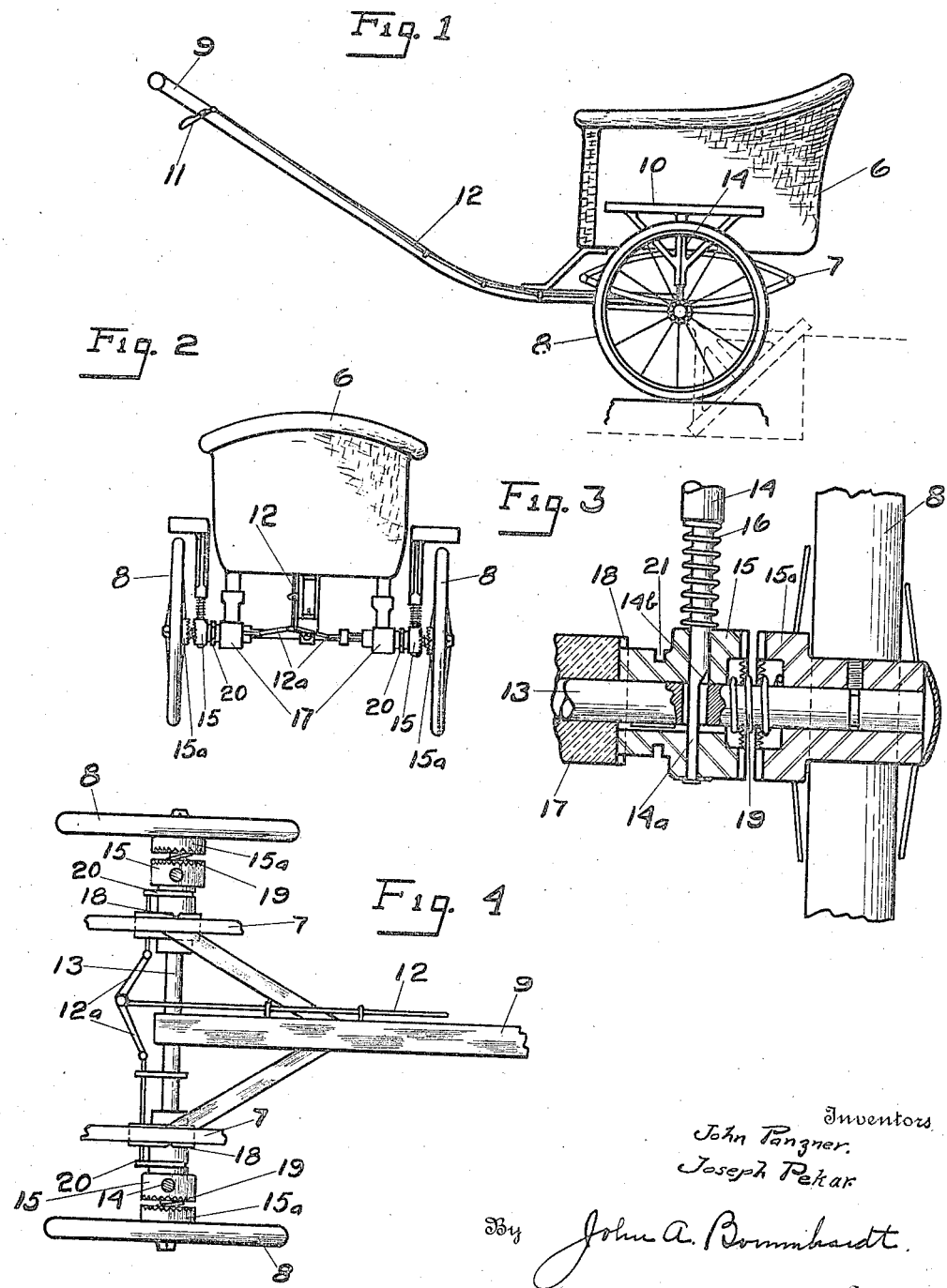

UNITED STATES PATENT OFFICE.

JOHN PANZNER, OF CUYAHOGA FALLS, AND JOSEPH PEKAR, OF AKRON, OHIO.

ATTACHMENT FOR BABY-CARRIAGES.

1,301,593.  Specification of Letters Patent.  Patented Apr. 22, 1919.

Application filed October 24, 1918. Serial No. 259,480.

*To all whom it may concern:*

Be it known that we, JOHN PANZNER and JOSEPH PEKAR, both subjects of Hungary, residing respectively at Cuyahoga Falls, Ohio, and Akron, in the county of Summit and State of Ohio, have invented certain new and useful Improvements in Attachments for Baby-Carriages, of which the following is a specification.

This invention relates to an attachment for baby carriages whereby a track or plate may be revolved to position under the wheels, by means of which the wheels may be readily rolled up stairways, curbs, and the like. Normally the plates are supported in position above the wheels, where they serve as fenders or guards, but by appropriate devices they may be lowered to the position referred to above.

In the accompanying drawing—

Figure 1 is a side elevation of a baby cart provided with the device, showing in full lines the plate in position above the wheel as a guard, and in dotted lines in position between the wheel and a curbing.

Fig. 2 is a rear end elevation.

Fig. 3 is a section of one of the wheel hubs and a coöperating clutch.

Fig. 4 is a plan of the running gear.

Referring specifically to the drawings, 6 indicates the body of a cart, 7 the springs, 8 the wheels and 9 the handle.

The devices forming the subject of the present invention are duplicated at each side wheel, and a description for one will answer for both.

Each device comprises a plate 10, carried by the outer end of a rod or bar 14, the inner end of which extends as indicated at 14$^a$ through an opening in the axle 13, on which the wheel 8 is mounted. The hub of the wheel is provided at its inner end with a ratchet clutch member 15$^a$, and this coöperates with another clutch member 15 mounted to slide on the axle, the rod 14 extending also through the clutch sleeve or member 15. The clutch members are normally forced apart by a coiled spring 19. The rod 14 is capable of a limited movement inwardly so that the wheel may contact with the plate 10 when said plate is lowered to form a track, but said rod is normally forced outwardly by a spring 16 coiled around the same and bearing against the clutch member 15. The inner end of the rod 14, where it works through the opening in the axle 13, has a cam 14$^b$ and when the rod is pushed in said cam surface contacts with the edge of the opening in the axle and forces the clutch member 15 to the left in Fig. 3, thereby releasing the same from the clutch member 15$^a$. The inner end of the clutch member 15 has a radial projection or tooth adapted to engage in a radial notch 18 in the bearing 17 in which the axle may turn, the purpose of this being to hold the clutch member 15 in such position that the rod 14 extends vertically above the axle and so holds the plate 10 in the position shown in Fig. 1, to form a guard.

The clutch members 15 are shifted outwardly to engage with the clutch members 15$^a$ by means of a lever 11 connected by a rod 12 to a toggle 12$^a$, the opposite arms of which are connected to shifting forks 20 which engage in grooves 21 in the clutch member 15.

The operation is as follows:

Normally, the plates 10 are supported in position to form guards for the wheels, as shown in Fig. 1, and the wheels 8 turn freely on the axle 13, the clutches being disengaged. To engage the clutches the lever 11 is operated and the clutch members 15 are shifted outwardly, thereby disengaging the inner ends thereof from the notches 18 and engaging the outer or clutch ends thereof with the clutch members 15$^a$. Then the axle rotates and the arms 14 are swung down carrying the plates 10 to position to form tracks for the wheels, as shown in dotted lines in Fig. 1, and the weight of the carriage compresses the springs 16, so that the wheels will come in contact with the plates 10 and roll thereon up and over the obstruction. At the same time however, the inward movement of the rods 14 causes the cam surface 14$^b$ to engage the axle, thereby forcing or shifting the clutch members 15 inwardly and disengaging the clutches, thereby permitting the wheels to turn freely as before. After passing up the curb or obstruction the lever 11 can again be operated to engage the clutches and lift the plates 10 to original position, when the clutch is again released by releasing the lever 11, the teeth on the inner ends of the movable clutch members finally engaging in the notches 18 to hold the parts in original position.

We claim:

1. An attachment for wheeled carriages, comprising plates adapted to form tracks for the wheels, radial supporting rods projecting from the axle and attached to said plates, clutches between the wheels and said rods, adapted to swing the latter to raise or lower the plates, and means to operate the clutches.

2. An attachment for wheeled carriages, comprising a plate adapted to swing from position above each wheel to position below the same, a clutch member fixed to each wheel, a movable clutch member on the axle adjacent each wheel, a rod carried by each of said movable clutch members and connected to each plate to support the same, means to engage the clutch members, and means to automatically release the same when the plates are swung to position below the wheels.

3. In an attachment for wheeled carriages, the combination with the axle and wheel thereon, of a fixed clutch member on the wheel, a slidable clutch member on the axle, a radial rod carried by the slidable clutch member and extending through the axle, a plate carried at the outer end of the rod, in position to form a track for the wheel when swung down, and means to shift the movable clutch member to and from the fixed clutch member.

4. In an attachment for wheeled carriages, the combination with the axle and wheel thereon, of a fixed clutch member on the wheel, a slidable clutch member on the axle, a radial rod carried by the slidable clutch member and extending through the axle, a plate carried at the outer end of the rod, in position to form a track for the wheel when swung down, and means to shift the movable clutch member to and from the fixed clutch member, including a cam surface on the rod engageable with the axle to shift the movable clutch member to disengagement when the plate is swung down.

5. In an attachment for wheeled carriages, the combination with the axle, a wheel loose thereon, and a bearing in which the axle may turn, of a fixed clutch member on the wheel hub, a movable clutch member slidable on the axle and engageable at one end with said clutch member and at the other end with the bearing, a swinging track plate carried by the movable clutch member, and means to shift the movable clutch member to engage the same with the wheel and disengage the same from the bearing, or vice versa.

In testimony whereof, we do affix our signatures in presence of two witnesses.

JOHN PANZNER.
JOSEPH PEKAR.

Witnesses:
J. W. FRAILOR,
RITA WINTER.

Copies of this patent may be obtained for five cents each, by addressing the "Commissioner of Patents, Washington, D. C."